Oct. 3, 1950 W. J. BUFORD 2,524,423
ANIMAL TRAP
Filed Oct. 6, 1945 2 Sheets-Sheet 1
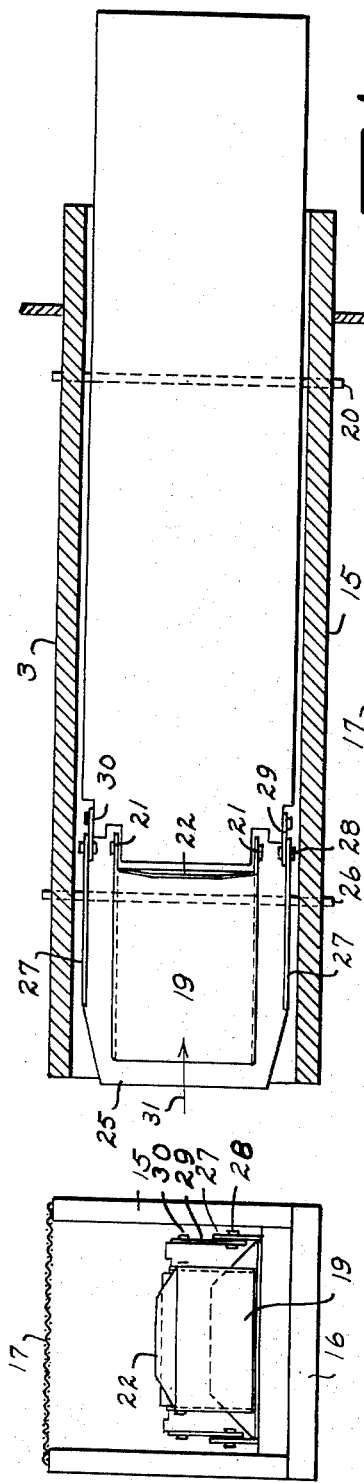
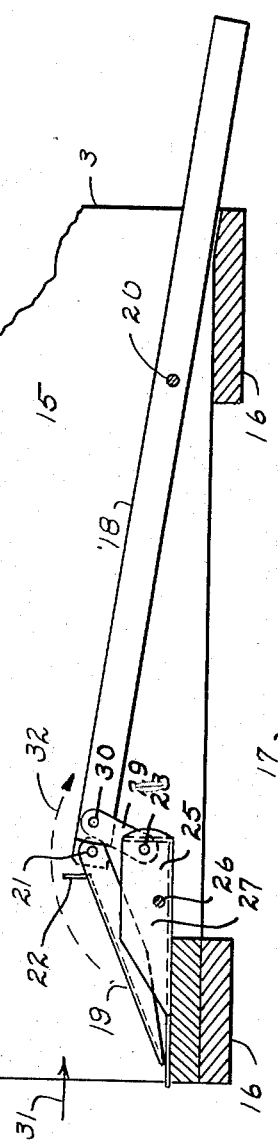
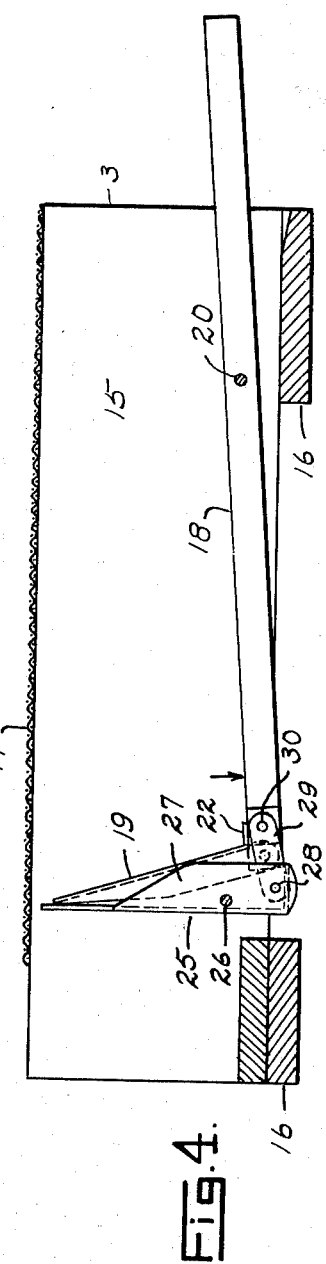
WILLIAM J. BUFORD
INVENTOR.
BY Lester B. Clark
Ray L. Smith
ATTORNEYS Oct. 3, 1950  W. J. BUFORD  2,524,423
ANIMAL TRAP Filed Oct. 6, 1945  2 Sheets-Sheet 2

WILLIAM J. BUFORD
INVENTOR.

BY Lester B. Clark
Ray L. Smith

ATTORNEYS

Patented Oct. 3, 1950

2,524,423

UNITED STATES PATENT OFFICE 2,524,423

ANIMAL TRAP

William J. Buford, Houston, Tex.

Application October 6, 1945, Serial No. 620,688

2 Claims. (Cl. 43—60)

This invention relates to traps such as are used for catching animals and is readily designed for the catching of animals of any size, but is of particular utility for catching small animals such as rodents.

The primary object of the invention is to provide a trap which comprises an enclosure having at least one entrance equipped with automatic closure means so that such entrance is normally open but closes whenever an animal enters same or attempts to leave after previously entering.

Another object of the invention is to provide a trap having a normally open passageway with cooperating tiltable floor sections including means operable by the tilting thereof from the weight of an animal to close the passageway.

Still another object is to provide a tiltable door element operable by movement of the floor to move to closed position whenever an animal enters upon the floor inwardly of the pivot fulcrum therefor.

Still another object in one form of the invention is to provide a door which serves as a portion of the entrance floor but which moves upwardly and forms a closure as an animal passes inwardly thereover.

It is also an object to provide a trap that will entrap animals in such a manner as not to cause injury thereto, thereby preventing injury to the pelt and the creation of odors that would deter other animals from approaching the trap.

The invention also contemplates the inclusion of means for removing animals from the principal enclosure so that their presence and behavior will not deter others from subsequently entering the trap.

It is also an object to provide a trap that is normally set and hence is capable of admitting animals thereto at all times.

The foregoing objects together with other objects and advantages of the invention will be more fully apparent from the following description considered in connection with the accompanying drawings in which:

Fig. 1 is a horizontal sectional view through one of the passageways showing the tiltable floor and door structure therein;

Fig. 2 is an end view taken from the left of Fig. 1;

Fig. 3 is a vertical sectional view through the device showing the relative position of parts when the passageway is open;

Fig. 4 is similar to Fig. 3, but shows the relative position of parts when the passageway is closed;

Figure 5:
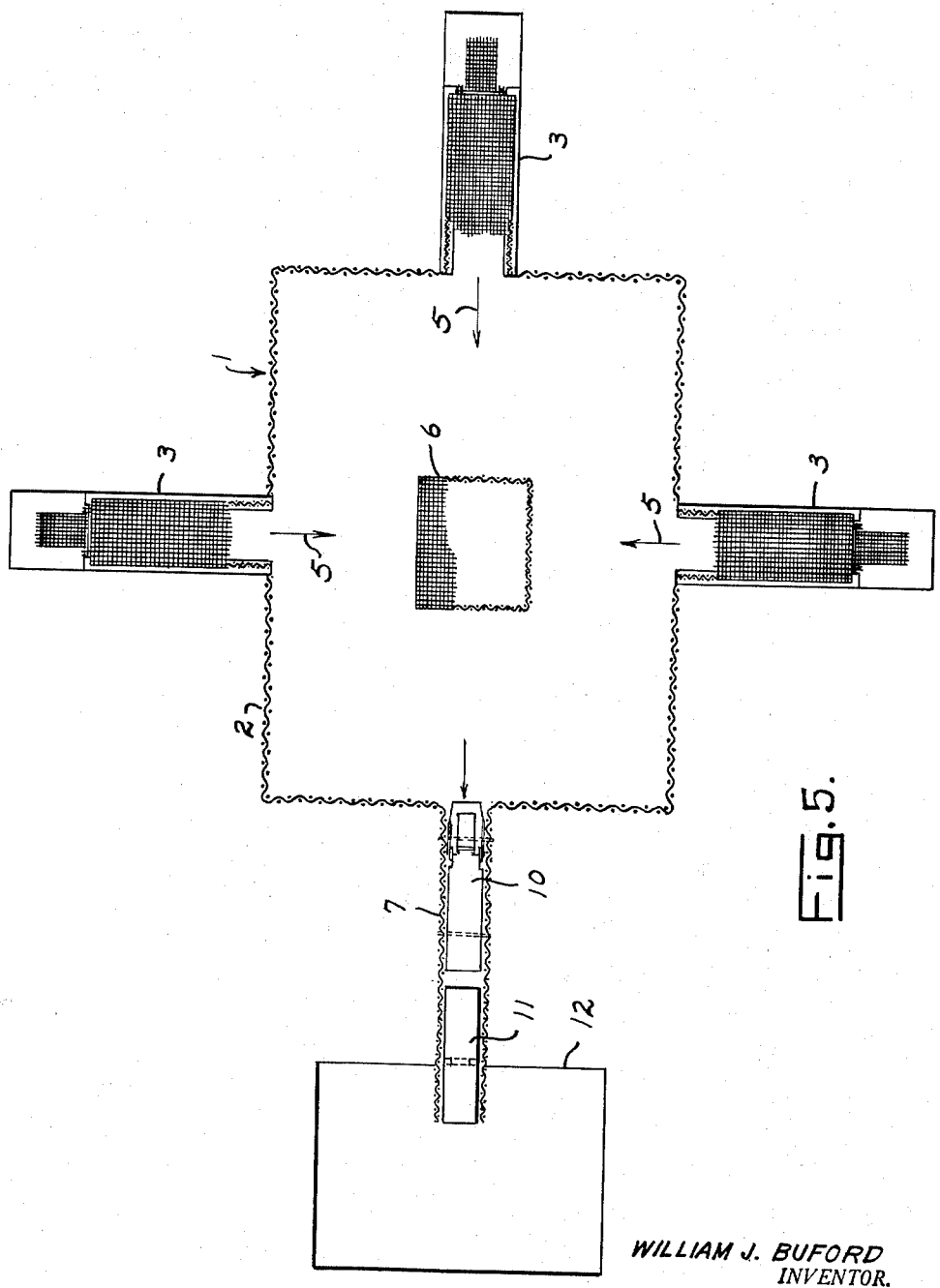
Fig. 5 is a plan view of a complete embodiment of the invention which includes the animal enclosure, a plurality of entrances therefor, and means for removing animals from within the principal enclosure.

Referring first to Fig. 5 it is to be noted that the invention comprises a principal enclosure 1 having sidewalls 2 of suitable material such as a wire mesh. If, of course, the trap is designed for catching animals that are capable of climbing, a suitable cover for the enclosure 2 will be provided.

The enclosure 1 has a plurality of entrances 3 of special construction and to which further attention will be directed, the entrances being constructed so that animals may enter in the direction of the arrows 5. Inwardly from the entrances 3 is a smaller enclosure 6 which is so located relative to the entrances that bait, live or otherwise, placed therein will be seen from each of the entrances.

Inasmuch as the presence of animals within the principal enclosure 1 may deter the entrance of other animals, the invention also provides a normally open passage 7 having a mechanism 10 which operates to close the passage when an animal seeks to leave the enclosure 1. Outwardly from the mechanism 10 there is a tiltable floor 11 over which the animal may move into the secondary closure 12 for disposition.

In accordance with Figs. 1 to 4 inclusive, each of the entrances 3 may comprise longitudinal sidewalls 15 mounted upon transverse supports 16 and having the mesh cover 17. A floor structure comprises sections 18 and 19 of which the former is pivoted at 20 within the entrance passageway while the latter has a pivotal connection at 21 at the inner end of the former. Section 19 has an upwardly extending arm 22 which, as shown in Fig. 4, is adapted to engage the upper surface of the section 18 when closure position of the device is reached.

To facilitate desired balancing of parts for ready response to the weight of an animal entering the trap, and also to provide a positive closure against accidental opening from the activities of an animal proximate the member 19, I provide a supplemental closure member 25 which is pivoted to the entrance structure at 26 and which has side flanges 27 within which the section 19 may enter and move freely from open to closed position. The inner end of the supplemental member 25 is pivoted at 28 to links 29 which are in turn pivotally attached to the member 18 at 30. It is to be understood that the relative dimensions and masses of the parts just described are such that normally the parts assume the relative positions indicated in Figs. 1, 2 and 3.

In the operation of the device and as just indicated, the parts are normally in the relative positions shown in Figs. 1, 2 and 3. If, however, an animal enters the device in the direction of the arrow 31 and moves along the member 19 toward the outer end of the member 18, downward movement of the interconnected ends of the members 18, 19 and 25 takes place by virtue of the weight of the animal so that it is forced inwardly as indicated by the arrow 32 as the component parts of the device assume the closure position shown in Fig. 4. Referring more specifically to Fig. 4 it is to be noted that the links 29 are substantially horizontal and that therefore any pressure applied to the surface 19 will be transmitted in a direction longitudinally of the links, and that for this reason opening of the device cannot be effected by such pressure. If, however, the animal moves inwardly along the floor 18 to and beyond the pivot 20, the mechanism will again return to the condition indicated in Figs. 1, 2 and 3.

As already indicated the mechanism 10 in the exit passage 7 is automatically operable to close the passage and such mechanism may assume the form just described in connection with Figs. 1 to 4 inclusive.

While the foregoing has been directed to structural details of specific embodiment of the invention, it is intended that such description shall be illustrative rather than limiting as the invention broadly comprehends a trap which comprises an enclosure having at least one entrance provided with automatic closure means which is normally open to permit entrance of an animal to be entrapped by the device.

What is claimed is:

1. A trap of the character described comprising, an enclosure and an entrance passageway, a floor for such passageway comprising inner and outer sections pivotally interconnected, said outer member being adapted to pivot to a substantially vertical position as an animal passes thereover, and additional means pivotally supported and connected to the inner section and movable to a vertical position to form a backing for said outer member when in closed position.

2. A trap of the character described comprising, an enclosure and an entrance passageway, a floor for such passageway comprising inner and outer sections pivotally interconnected, said outer member being adapted to pivot to a substantially vertical position as an animal passes thereover, and additional means pivotally supported and connected to the inner section and movable to a vertical position to form a backing for said outer member when in closed position, said last mentioned means comprising a link connection movable into substantial alignment with the inner floor member when the passage is closed.

WILLIAM J. BUFORD.

REFERENCES CITED

The following references are of record in the file of this patent:

UNITED STATES PATENTS

| Number | Name | Date |
| --- | --- | --- |
| 1,541,639 | Gregory | June 9, 1925 |
| 1,866,228 | Smith | July 5, 1932 |
| 2,225,251 | Andrick | Dec. 17, 1940 |
| 2,235,483 | Jacobs | Mar. 18, 1941 |